United States Patent [19]
Mihara

[11] Patent Number: 5,774,352
[45] Date of Patent: *Jun. 30, 1998

[54] POWER CIRCUIT FOR DRIVING A CAPACITIVE LOAD

[75] Inventor: Masaaki Mihara, Chiba, Japan

[73] Assignee: SGS-Thomson Microelectronics K.K., Tokyo, Japan

[*] Notice: The term of this patent shall not extend beyond the expiration date of Pat. No. 5,705,895.

[21] Appl. No.: 572,118

[22] Filed: Dec. 14, 1995

[30] Foreign Application Priority Data

Dec. 14, 1994 [JP] Japan ..................................... 6-310564

[51] Int. Cl.$^6$ .......................... H02M 3/335; H02M 7/217
[52] U.S. Cl. ............................. 363/133; 363/132; 363/17
[58] Field of Search ..................................... 363/133, 132, 363/13, 17; 315/209 R, 219; 323/207

[56] References Cited

U.S. PATENT DOCUMENTS

| | | | |
|---|---|---|---|
| 4,021,747 | 5/1977 | Todokoro | 330/13 |
| 4,291,366 | 9/1981 | Nelson | 363/17 |
| 5,495,405 | 2/1996 | Fujimura et al. | 363/133 |

Primary Examiner—Stuart N. Hecker
Assistant Examiner—Rajnikant B. Patel
Attorney, Agent, or Firm—David V. Carlson; Robert Iannucci; Seed and Berry LLP

[57] ABSTRACT

A power terminal is connected to a DC power source. A differential amplifier has primary and secondary input terminals and an output terminal, and a device applies a reference voltage to the secondary input terminal of the differential amplifier. A phase inverter has an input terminal connected to the output terminal of the differential amplifier and has primary and secondary output terminals that output two output signals of opposite phase. A push-pull drive circuit has primary and secondary input terminals connected to the primary and secondary output terminals of the phase inverter, and has primary and secondary output terminals connected to a switching element that alternately turns on and off by being driven by the two output signals of opposite phase that are provided from the output terminals of the phase inverter. An autotransformer has a tap connected to the power terminal and taps, provided at both sides of the tap connected to the power terminal, that are connected to the primary and secondary output terminals at the push-pull drive circuit, respectively. A capacitive load may be connected at both sides of the autotransformer. A positive feedback path connects one terminal of the autotransformer to the primary input terminal of the differential amplifier, and a sinusoidal AC voltage is applied to the capacitive load.

25 Claims, 4 Drawing Sheets

5,774,352

POWER CIRCUIT FOR DRIVING A CAPACITIVE LOAD

CROSS-REFERENCE TO RELATED APPLICATION

This application is related to an application entitled "Power Circuit With Duty Conversion Circuit or Driving A Capacitive Load" by the same inventor, application No. 08/572,664 and filed Dec. 14, 1995, which is hereby incorporated by reference.

TECHNICAL FIELD

The present invention relates to a power circuit, and more particularly, to a power circuit for driving a capacitive load.

BACKGROUND OF THE INVENTION

An electroluminescent panel is used as a flat panel display in many products. One common use is in a wrist watch. The power for driving the electroluminescent panel in a wrist watch is provided by a battery. A DC voltage must be converted into an AC voltage, which is then applied to the electroluminescent panel. However, it is necessary to maintain the frequency of this AC voltage at several hundred Hz and the peak-to-peak value of this AC voltage at several hundred volts because of the characteristics of the electroluminescent panel.

Existing power circuits that use the charging and discharging of a capacitor, in a circuit with an inductor, have been proposed as a power circuit to generate an AC voltage of several hundred volts from a DC voltage of tens of volts for use as described above. They are described in U.S. Pat. Nos. 4,208,869; 4,449,075; and 4,527,096.

Some existing power circuits for electroluminescence that use the charging and discharging of a capacitor, and power circuits for electroluminescence that use an inductor, generate rectangular waveforms. Therefore, they have the problem of a low luminous efficiency at the electroluminescent panel as well as the generation of a large amount of noise.

A power circuit for electroluminescence using a transformer has been developed in order to reduce the above problem. The electroluminescent panel, which is a capacitive load, makes up a resonance circuit in the power circuit using a transformer, and an AC voltage in a sinusoidal waveform is applied to the electroluminescent panel. Therefore, it has the advantages of reduced noise generation and high luminous efficiency.

However, the size of the transformer having a primary coil and a secondary coil is quite large, and the capacitance of the entire power circuit accordingly becomes large. Therefore, containing the power circuit within the housing of a wrist watch is difficult. Furthermore, the cost of the transformer is high, so increased cost of the entire power circuit presents another problem. Moreover, in order to emit a relatively large electroluminescence, it is necessary to increase the capacity of the transformer, and the transformer consequently becomes larger and heavier. Accordingly, power circuits for electroluminescence that use transformers are only used today in large size display panels and they cannot be used in small size applications, such as a wrist watch.

SUMMARY OF THE INVENTION

An object of this invention is to provide a lightweight and low-cost power circuit for driving capacitive loads. Another object of the invention is to provide a power supply which allows electroluminescence to be emitted at high efficiency without generating noise.

The power circuit of this invention attains these and other objects. In the invention, a power input terminal is connected to a DC power source. A differential amplifier has primary and secondary input terminals and an output terminal. A reference voltage is applied to the secondary input terminal of the differential amplifier. A phase inverter has an input terminal connected to the output terminal of the differential amplifier and has primary and secondary output terminals that output two output signals of opposite phase. A push-pull drive circuit has primary and secondary input terminals connected to the primary and secondary output terminals of the phase inverter, and has primary and secondary output terminals connected to a switching element that alternately turns on and off by being driven by the two output signals of opposite phase that are provided from the output terminals of the phase inverter. An autotransformer has a tap connected to the power terminal and taps, provided at both sides of the tap connected to the power terminal, that are connected to the primary and secondary output terminals at the push-pull drive circuit, respectively. A capacitive load may be connected at both sides of the autotransformer. A positive feedback path connects one terminal of the autotransformer to the primary input terminal of the differential amplifier, and a sinusoidal AC voltage is applied to the capacitive load.

An autotransformer, also called a single-coil transformer, is used in the power circuit of this invention. It is much easier to manufacture an autotransformer than a common transformer with a secondary coil. The cost can be substantially reduced, and the capacity can also be reduced. Accordingly, a reduction in size and weight, as well as a low cost, can be attained when compared to existing power circuits using transformers with secondary coils.

Furthermore, the resonance circuit consists of an autotransformer and a capacitive load. Therefore, the waveform of the output voltage that drives the load takes the form of a sine wave. The use of a sine wave generates less noise and can particularly improve the luminous efficiency when an electroluminescent panel is used as the load. The resonance frequency of this resonance circuit is also in a reverse proportion to the sum of the inductance of the autotransformer and the capacitance of the load. The capacitance of the panel decreases through changes with the passage of time when an electroluminescent panel, for example, is used as the load. However, the luminous intensity does not change much but remains almost constant because the resonance frequency in that case increases. In other words, this invention provides the further advantage that the luminous intensity is maintained almost constant for a long period of time.

The features of the present invention shall be made more evident by the following detailed description of a preferred and alternative embodiments of the invention, described as non-limiting examples of the present invention.

DETAILED DESCRIPTION OF THE INVENTION

Figure 1:
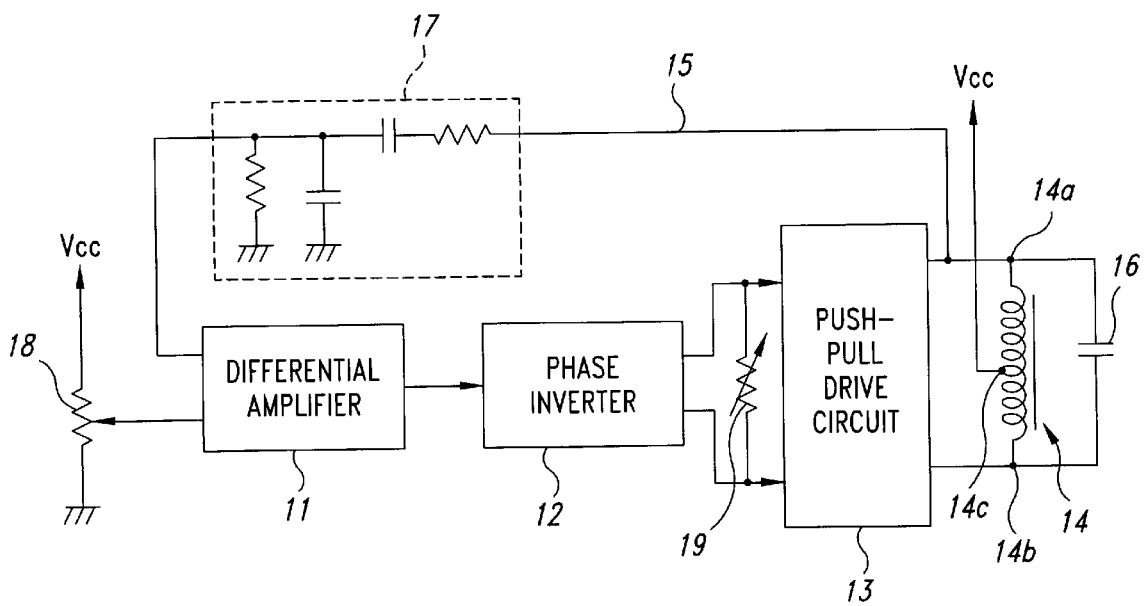
FIG. 1 is a block diagram of a power circuit of a preferred embodiment of the present invention.

FIG. 1 is a block diagram which indicates the structure of the power circuit in this invention in an application example;

an electroluminescent panel is driven as a capacitive load in this example. A power circuit in this invention is equipped with a differential amplifier 11, a phase inverter 12, a push-pull drive circuit 13, an autotransformer 14, and a positive feedback path 15. An output terminal of the differential amplifier 11 is connected to an input terminal of the phase inverter 12, and signals of the opposite phase, that is, 180° out of phase from each other, are generated. These output signals are supplied to the push-pull drive circuit 13. The primary output terminal and the secondary output terminal of the push-pull drive circuit 13 are connected to both ends 14a and 14b at the autotransformer 14, respectively. A tap 14c of the autotransformer 14 is connected to a positive terminal of the power source $V_{cc}$ that is connected to the positive electrode of a DC power source. An electroluminescent panel 16, which is shown as a capacitive load, is connected between both ends 14a and 14b of the autotransformer 14. The terminal 14a at one end of the autotransformer 14 is connected to an input terminal at one end of, the differential amplifier 11 by way of the positive feedback path 15. A filter 17 is connected within this positive feedback path. This filter is for adjusting the Q at the resonance circuit that consists of the autotransformer 14 and the electroluminescent panel 16 as the load. Therefore, the filter is not necessary and may be eliminated. A feedback path without a filter may be used if desired. The input terminal on the other side of the differential amplifier 11 is connected to a tap at a potentiometer 18 that is connected in series to the DC power source in order to apply the needed reference voltage.

The autotransformer 14 and the electroluminescent panel 16 make up a parallel resonance circuit in the power circuit in this invention described above. Therefore, the waveform of the AC voltage that is applied to the electroluminescent panel 16 takes the form of a sine wave, and the generation of noise is accordingly reduced and the luminous efficiency of the electroluminescent panel is also increased. Furthermore, the resonance frequency f of the parallel resonance circuit can be indicated as $f = \frac{1}{2}\pi(L \cdot C)^{1/2}$ where the inductance of the autotransformer 14 is L and the capacity of the electroluminescent panel 16 is C. The capacity C of the electroluminescent panel 16 in this example decreases over a period of time, and therefore, the luminous intensity accordingly decreases through changes over time when the peak-to-peak value of the AC voltage is constant. However, the frequency f of the AC voltage increases in this invention as the electroluminescent panel 16 deteriorates and the capacity C decreases, as can be observed in the equation above. Therefore, the luminous intensity of the electroluminescent panel can be maintained almost constant over time.

Furthermore, as indicated in FIG. 1, a variable resistor 19 is connected between the primary and secondary output terminals at the phase inverter 12 so as to adjust the balance of the drive voltage of opposite phase that is supplied to the push-pull drive circuit 13. Accordingly, the waveform can be modified to become a sinusoidal waveform by adjusting this variable resistance 19 when the waveform of the AC voltage that is applied to the electroluminescent panel 16 deviates from the sinusoidal waveform. Resistor 19 can be provided and adjusted according to conventional methods. For example, resistor 19 can be an integrated thin film resistor that can be adjusted using known trimming methods, such as laser trimming. Alternatively, resistor 19 can be a standalone, variable resistor, as necessary. A determination of a need to adjust resistor 19 can be made during a testing phase of the manufacturing process, and resistor 19 can be adjusted accordingly. Alternatively, an end customer could determine a need to adjust resistor 19 and could adjust it accordingly.

Figure 2:
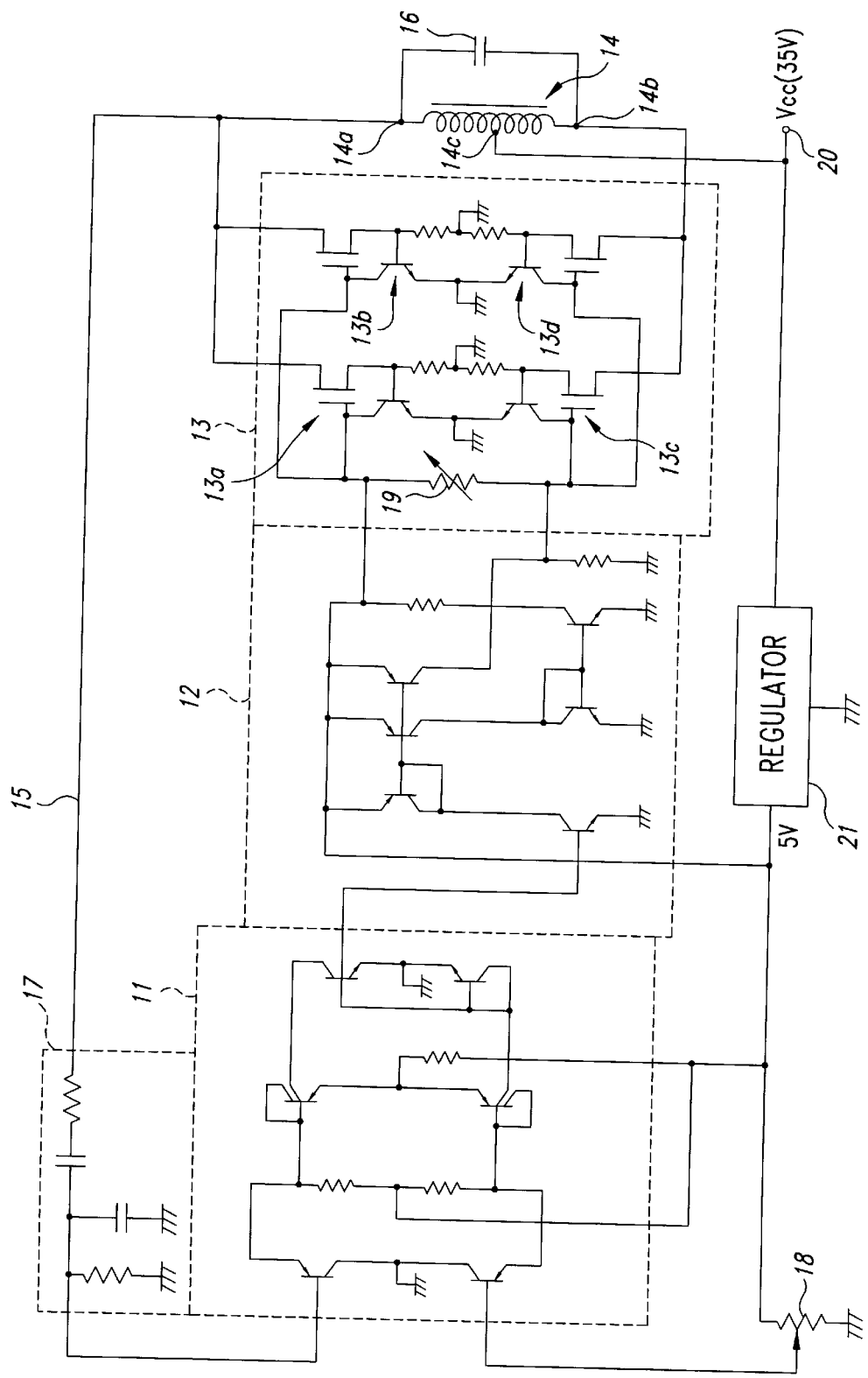
FIG. 2 is a detailed circuit diagram of a preferred embodiment of a power circuit of the present invention.

FIG. 2 is a circuit diagram showing a detailed structure of the power circuit of the present invention shown in the block diagram of FIG. 1. The areas in FIG. 2 that are the same as the areas indicated in FIG. 1 are indicated and have the same numbers attached. The differential amplifier 11 and the phase inverter 12 each have a known structure, and their explanation will be omitted. Signals in the sine waves of opposite phase are output from the primary and secondary output terminals of the phase inverter 12, and these signals are supplied to each of the primary and secondary input terminals at the push-pull drive circuit 13. The primary input terminal of the push-pull drive circuit 13 is connected to a set of transistors 13a and 13b that consists of primary and secondary bipolar transistors and FETs. The secondary input terminal is connected to a set of third and fourth transistors 13c and 13d. Accordingly, it operates so that the set of primary and secondary transistors 13a and 13b are simultaneously conductive and the set of third and fourth transistors 13c and 13d are simultaneously blocked. The terminal 14a at one side of the autotransformer 14 is connected to the set of primary and secondary transistors 13a and 13b, the terminal 14b at the other side is connected to the set of third and fourth transistors 13c and 13d, and the tap 14c of the autotransformer is connected to the power terminal 20 that is connected to the positive terminal of the DC power source $V_{cc}$. The voltage of the DC power source in this example is 35 V.

A 3 terminal regulator 21 is connected to the DC power source in order to obtain a drive voltage of 5 V for the differential amplifier 11 and the phase inverter 12. The potentiometer 18 is also connected to the output terminal at 5 V at this 3 terminal regulator 21 and its tap is connected to a negative input terminal of the differential amplifier 11 in order to obtain a reference voltage that is applied to the negative input terminal of the differential amplifier 11. Accordingly, an optimum reference voltage can be obtained by adjusting the position of the tap at this potentiometer 18.

In this manner, a sinusoidal AC voltage with a peak-to-peak value of 200 V and a frequency of 250 Hz from a DC power source at 35 V can be applied to the electroluminescent panel in this application example.

Figure 3:
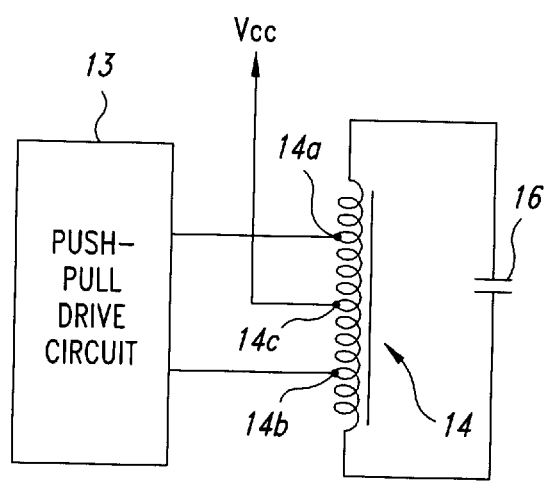
FIG. 3 is a circuit diagram of an autotransformer of a power circuit of the present invention.

FIG. 3 indicates the structure of an autotransformer in the power circuit of the present invention. The primary and secondary output terminals of the push-pull drive circuit 13 were connected between both ends 14a and 14b of the autotransformer 14 in the application example described above. However, there is the possibility that the peak-to-peak value of the output voltage that is applied to the load may drop below the needed value when the voltage $V_{cc}$ of the DC power source is low. As shown in FIG. 3, the primary and secondary output terminals of the push-pull drive circuit 13 are not connected to both ends of the autotransformer 14 but they are instead connected between the tap 14c and both ends 14a and 14b in this example. The positions of the taps to which the primary and secondary output terminals of the push-pull drive circuit 13 are connected may be halfway between the tap 14c and both ends 14a and 14b. However, they can be shifted to either side according to the voltage of the DC power source $V_{cc}$ and the value of the output voltage. Through this structure, an output voltage in the sinusoidal wave having the needed peak-to-peak value can be obtained when the voltage of the DC power source $V_{cc}$ is low—at 25V, for example.

This invention is not limited only to the application example described above, and many alterations and modifications are possible. For example, an electroluminescent panel was used as the capacitive load in the application example described above, but other optional capacitive loads can also be fed. A filter was provided in the positive feedback path in order to increase the Q of the resonance in the application example above; however, this filter may be eliminated. Furthermore, the tap of the autotransformer was positioned at the center of the coil in the application examples described above; however, it is not necessary to position it at the center.

Figure 4:
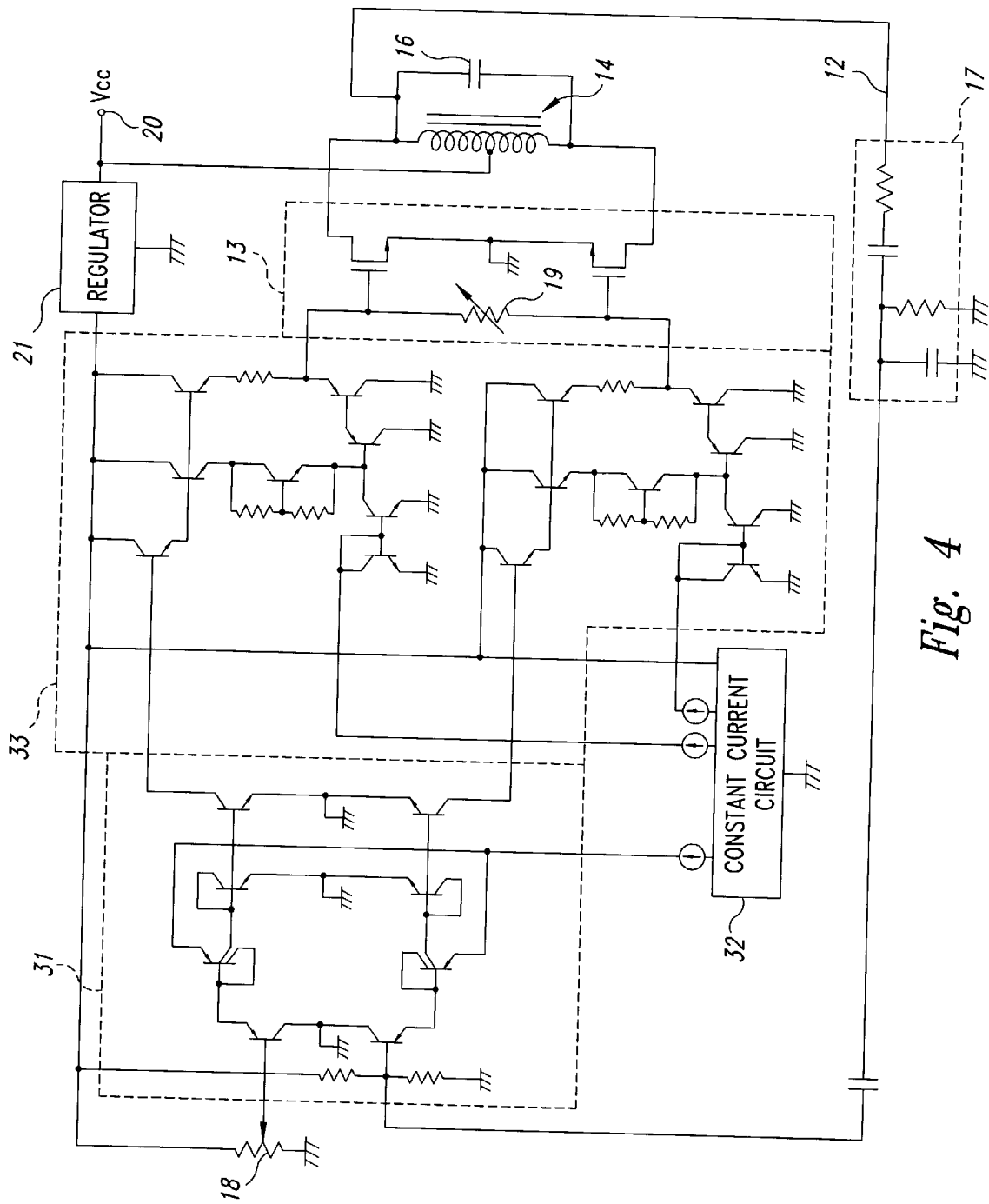
FIG. 4 is a circuit diagram of a power circuit of an alternative embodiment of the present invention.

A differential amplifier and a phase inverter were individually provided in the application example described above, but they can be structured as one circuit. FIG. 4 indicates a circuit diagram of a structure equipped with a differential amplification/phase inverting circuit 31 that functions as both the differential amplifier and the phase inverter. In the basic structure of this differential amplification/phase inverting circuit 31, two output signals of opposite phase are output from the output side of the differential amplifier in the application example described above. A constant current circuit 32 for the differential amplification/phase inverting circuit 31 and the push-pull drive circuit 13 is also provided. A power amplification circuit 33 is also provided between the differential amplification/phase inverting circuit 31 and the push-pull drive circuit 13. This circuit is provided in order to attain high-speed switching even when the gate capacitance of the power MOS FET is large. However, this can be eliminated in some cases. The structure and operation of other areas in FIG. 3 are the same as in the application example described above, and therefore, detailed explanation will be eliminated.

The resonance circuit includes a capacitive load and an autotransformer in the power circuit in the invention described above. Therefore, a sinusoidal voltage can be applied to the load. The luminous efficiency can be improved to over 70%, and the generation of noise can also be reduced when an electroluminescent panel, for example, is used as the load. Furthermore, the autotransformer can be small in size and light in weight when compared to a common transformer having an existing secondary coil, and the cost can also be reduced substantially. The capacitance lowers through changes over time when an electroluminescent panel is used as the load. However, the frequency of the output voltage increases according to this lowering in capacitance. Therefore, lowering of the luminous intensity of the electroluminescent panel can be prevented.

While various embodiments have been described in this application for illustrative purposes, the claims are not so limited. Rather, any equivalent device operating according to principles of the invention falls within the scope thereof.

I claim:

1. A power circuit comprising:
   a differential amplifier having first and second inputs and an output, the first input being connected to receive a first voltage;
   a phase inverter having an input connected to receive the output of said differential amplifier and having first and second outputs with first and second phases;
   a push-pull drive circuit having first and second inputs connected to the first and second outputs of said phase inverter and having first and second outputs;
   a feedback path coupling the first output of said push-pull drive circuit to the second input of said differential amplifier; and
   an autotransformer having first and second ends coupled between the first and second outputs of said push-pull drive circuit, said autotransformer having a tap connected to a source of a second voltage that is higher than the first voltage.

2. The power circuit of claim 1 further including a filter positioned in said feedback path.

3. The power circuit of claim 1, further comprising:
   a voltage balancing circuit connected across the first and second outputs of said phase inverter, said voltage balancing circuit being capable of adjusting a balance of the sinusoidal waveform applied to the load.

4. The power circuit of claim 3 wherein said voltage balancing circuit comprises a variable resistor.

5. The power circuit accordingly to claim 1 further including a capacitive load attached to the first and second ends of said autotransformer.

6. The power circuit of claim 5 wherein said capacitive load comprises an electroluminescent panel.

7. The power circuit according to claim 1 wherein said feedback path is a positive feedback path.

8. The power circuit of claim 1 wherein the tap is positioned halfway between the first and second ends of said autotransformer.

9. The power circuit of claim 1 further comprising:
   a voltage regulator capable of maintaining the first voltage at a predetermined voltage level, said voltage regulator being connected between the second input of said differential amplifier and the source of the second voltage.

10. The power circuit of claim 9 wherein said voltage regulator comprises a potentiometer having an end connected to the source of the second voltage and another end connected to a reference voltage, said potentiometer having a tap connected to the second input of said differential amplifier.

11. The power circuit of claim 1 wherein said autotransformer has a first tap connected to the source of the second voltage, a second tap connected to the first output of said push-pull drive circuit, and a third tap connected to the second output of said push-pull drive circuit, the second and third taps being on different sides of the first tap.

12. The power circuit of claim 11 wherein the second and third taps are positioned halfway between the first tap and the first and second ends of said autotransformer, respectively.

13. The power circuit of claim 1 wherein said push-pull drive circuit comprises a switching element that switches the first and second outputs of said push-pull drive circuit, said switching element being responsive to the first and second outputs of said phase inverter.

14. The power circuit of claim 13 wherein said switching element comprises:
   a first set of switches that switches the first output of said push-pull drive circuit responsive to the first output of said phase inverter; and
   a second set of switches that switches the second output of said push-pull drive circuit responsive to the second output of said phase inverter, said second set of switches being nonconductive when said first set of switches is conductive and said second set of switches being conductive when said first set of switches is nonconductive.

15. The power circuit of claim 14 wherein:
   said first set of switches comprises a set of first and second transistors; and
   said second set of switches comprises a set of third and fourth transistors.

16. A power circuit comprising:

a differential amplification/phase inverting circuit having first and second inputs, the first input being connected to a first voltage, said differential amplification/phase inverting circuit having first and second sinusoidal outputs having first and second phases;

a push-pull drive circuit having first and second inputs connected to the first and second outputs of the differential amplification/phase inverting circuit and having first and second outputs;

a positive feedback path connecting the first output of said push-pull drive circuit to the first input of said differential amplification/phase inverting circuit; and an autotransformer having first and second ends connected to the first and second outputs of said push-pull drive circuit, said autotransformer having a tap connected to a source of a second voltage higher than the first voltage, the first and second ends being connectable to a capacitive load such that a sinusoidal waveform is applied to the load.

17. The power circuit of claim 16, further comprising a constant current source connected to said differential amplification/phase inverting circuit and connected to said push-pull drive circuit.

18. The power circuit of claim 16, further comprising:

a power amplification circuit having first and second inputs connected to the first and second outputs of said differential amplification/phase inverting circuit and having first and second outputs connected to the first and second inputs of said push-pull drive circuit.

19. The power circuit of claim 16, further comprising:

a voltage regulator having an input connected to the source of the second voltage and an output connected to the second input of said differential amplification/ phase inverting circuit.

20. The power circuit of claim 16 wherein said positive feedback path comprises a filter.

21. The power circuit of claim 16, further comprising:

a voltage balancing circuit connected between the first and second inputs of said push-pull drive circuit, said voltage balancing circuit being capable of adjusting a balance of the sinusoidal waveform applied to the load.

22. A power circuit comprising:

a power terminal connected to a DC power source;

a differential amplifier that has primary and secondary input terminals and an output terminal;

a device that applies a reference voltage to the secondary input terminal of said differential amplifier;

a phase inverter that has an input terminal connected to the output terminal of said differential amplifier and primary and secondary output terminals that output two output signals of opposite phase;

a push-pull drive circuit that has primary and secondary input terminals connected to the primary and secondary output terminals of said phase inverter, said push-pull circuit having primary and secondary output terminals that are connected to a switching element that alternately turns on and off by being driven by the two output signals of opposite phase and provided from the output terminals of the phase inverter;

an autotransformer with a tap that is connected to said power terminal and taps at both sides of the tap connected to said power terminal, the taps at both sides of the tap connected to said power terminal being connected to the primary and secondary output terminals at said push-pull drive circuit, respectively, in order for a capacitive load to be connected at both sides and such that a sinusoidal AC voltage is applied to the load; and a positive feedback path that connects one terminal of said autotransformer to the primary input terminal of said differential amplifier.

23. The power circuit of claim 22 wherein said positive feedback path comprises a filter.

24. The power circuit of claim 22 further comprising:

a variable resistance between the primary and secondary input terminals of said push-pull drive circuit, said variable resistance being capable of adjusting the waveform of the sinusoidal AC voltage applied to the load.

25. The power circuit of claim 22 wherein an electroluminescent panel is connected as the load.

* * * * *